United States Patent [19]

Wiecko et al.

[11] 3,894,617

[45] July 15, 1975

[54] DEVICE FOR THE BRAKING OF SHAFT CARRYING SPIRALLY WOUND RAW MATERIAL, PARTICULARLY IN TEXTILE MACHINES

[75] Inventors: Ryszard Wiecko; Henryk Sabiniak; Marcin Formanski, all of Lodz, Poland

[73] Assignee: Centralno Biuro Techniczne Przemyslu Maszyn Wlokienniczych, Lodz, Poland

[22] Filed: Jan. 30, 1974

[21] Appl. No.: 437,883

[30] Foreign Application Priority Data

Feb. 19, 1973 Poland .................................. 160817

[52] U.S. Cl. ...................... 188/75; 28/35; 139/100; 188/195; 242/75.4
[51] Int. Cl. ............................................. F16d 51/16
[58] Field of Search ............ 188/75, 195; 242/75.4, 242/75.46, 156; 139/100, 109; 66/86 A; 28/35, 42

[56] References Cited
UNITED STATES PATENTS

| 392,512 | 11/1880 | Hamblin | 139/100 |
|---|---|---|---|
| 1,395,830 | 11/1921 | Jones | 188/75 |
| 2,397,663 | 4/1946 | Hepp | 66/86 A |
| 2,645,838 | 7/1953 | Lambach | 28/35 |
| 2,652,132 | 9/1953 | Browning | 188/75 |
| 2,777,546 | 1/1957 | Kelley | 188/75 |
| 3,012,735 | 12/1961 | Nebout | 242/75.4 |
| 3,456,895 | 7/1969 | Scordato | 188/75 |
| 3,799,210 | 3/1974 | Gardella | 188/75 |

OTHER PUBLICATIONS

Italian Patented Publication, Giuseppe, Vol. 52, No. 259, Jan. 13, 1890.

Primary Examiner—Trygve M. Blix
Assistant Examiner—Edward R. Kazenske
Attorney, Agent, or Firm—Karl F. Ross; Herbert Dubno

[57] ABSTRACT

A brake for a warping shaft or the like carrying a spirally wound strand of material as a brake drum and is supported by respective arms of a pair of double-arm levers carried by a support. Antifriction bearing means is provided between these arms and the shaft. The other arms of the levers carry brake shoes which cooperate with the drum so that, when the shaft is placed upon the assembly, the pressure on one arm of each lever swings the brake shoe toward engagement with the drum.

2 Claims, 1 Drawing Figure

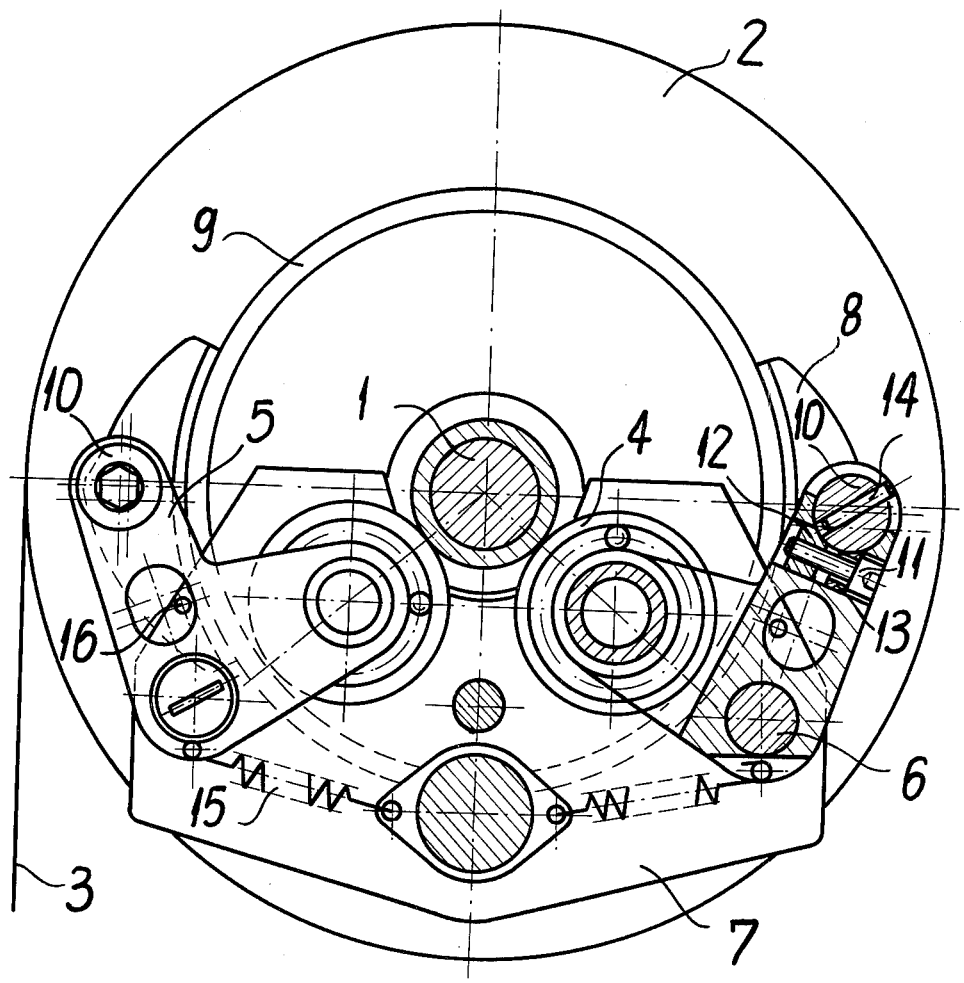

DEVICE FOR THE BRAKING OF SHAFT CARRYING SPIRALLY WOUND RAW MATERIAL, PARTICULARLY IN TEXTILE MACHINES

This invention relates to a device for the braking of a shaft carrying spirally wound material, particularly in textile machines.

In the known device for the braking of warping shafts in a sizing machine, a steady tension of warp threads unreeled from one or more warping shafts requires that all shafts are fitted with a band brake. The change of the braking moment during the unreeling process is obtained by changing the position of the weight on a lever of a band brake. The last warping shaft in the machine has a pin fixed on the shaft disc, this pin coopertating with a star wheel which drives, through a stepless reduction transmission, the crankwheel together with the connecting rod. The motion of the connecting rod is transmitted to a rod which regulates the position of weights on the band-brake levers. The initial braking moment is adjusted by suitably adjusting the crankwheel and the connecting rod, thus establishing the initial positions of weights on the band-brake levers.

The imperfection of the above described construction is a greater tension than the predetermined level and the development of pulsating tension in the warp threads in the starting phase; this tension is caused by overcoming the warping-shaft inertia, and the instability of the coefficient of friction in the band brake at starting. For every kind of material and for every diameter of unreeling an individual ratio of the stepless gear transmission has to be selected, and the position of the connecting rod in relation to the crankwheel has to be established.

The very complex construction, embracing the band brakes, a reduction transmission, a stepless transmiission, a crank mechanism, and a rod for moving the weights, occupies a large space, makes the relacement of the warping shafts complicated, and causes the time required for servicing of the machine to be lengthened.

The aim of the present invention is to eliminate or mitigate the above mentioned imperfections of construction and to obtain an optimum tension of unreeling, by maintaining a steady ratio of the inertia moment of the shaft at stopping the machine, to the braking moment in the shaft in any phase of unreeling.

The device of the invention for the braking of a shaft carrying spirally wound material comprises a pair of two-arm angular levers (double-arm or bell crank levers) and respective brake shoes, the two-arm levers being self-aligned on pins fixed in the plate of the stand, while one end of each lever supports the shaft journal with antifriction bearings are installed, and at the other end the respective brake shoe is carried, the brake shoes engage the brake drum and are mounted on excentric shafts which are fixed in the levers, the points of contact between the supporting elements and the journal lying on a common circle or on different circles coaxial with the shaft journal, the coefficient of friction at the points of contact being either the same or different.

A modified version of the device is designed in such a manner that the anti-friction bearing is fixed on the shaft journal and the ends of the levers have cylindrical faces supported on the outer race of this bearing.

The invented device is simple in construction, is very durable and efficient in operation, and setting of the required nominal braking moment is very easy. The brake shoes disengage automatically after the shaft is lifted up, and they automatically engage when a new shaft is installed, thus simplifying servicing and shortening its time.

An embodiment of the invention will now be described with reference to the accompanying drawing in which the sole FIGURE shows the device in cross-section.

A journal 1 of a shaft 2 with a raw material 3 wound thereon is freely supported in ball bearings 4, said ball bearings being fixed in the ends of two-arm levers 5, said levers being self-aligned on pins 6 fixed in a plate 7 of a stand. Brake shoes 8 are installed at the opposite ends of the two-arm levers 5, said brake shoes engaging a brake drum 9 fixed on the shaft 2. The brake shoes 8 are fixed on excentric shafts 10, said excentric shafts being locked with bolts 11 through clamping elements 12 and 13. A pin 14 establishes the motion of excentric shaft 10. In the lower part of the levers 5 there are hooked tensioning springs 15 keeping the levers 5 in an open position after the shaft 2 is removed by lifting it up. In the plate 7 of the stand, pins 16 are installed, said pins limiting the opening of layers 5.

What we claim is:

1. A warping shaft assembly or the like comprising:
   a shaft adapted to carry a feed and spiral strand of material;
   a support adjacent said shaft;
   a pair of double-arm levers fulcrumed on said support and each having first and second angularly adjoining arms;
   antifriction bearing means between said first arms and said shaft for rotatably supporting said shaft on said first arms of both levers at two spaced-apart locations allowing lifting of said shaft away from said support;
   a brake drum carried by said shaft;
   respective brake shoes carried by the second arms of each of said levers and frictionally engageable with said brake drum when said bearing means is rotatably supporting said shaft; and
   excentric means for adjustably mounting each of said brake shoes on the respective second arm.

2. The assembly defined in claim 1 wherein said antifriction means includes a respective roller bearing journaled on each of said first arms and osculating said shaft.

* * * * *